(12) United States Patent
Awano et al.

(10) Patent No.: US 8,277,770 B2
(45) Date of Patent: Oct. 2, 2012

(54) METHOD OF MANUFACTURING CARBON NANOTUBE

(75) Inventors: Yuji Awano, Kawasaki (JP); Shigeya Naritsuka, Aichi (JP); Akio Kawabata, Kawasaki (JP); Takahiro Maruyama, Aichi (JP)

(73) Assignees: Fujitsu Limited, Kawasaki (JP); Meijo University Educational Foundation, Nagoya-shi (JP)

( * ) Notice: Subject to any disclaimer, the term of this patent is extended or adjusted under 35 U.S.C. 154(b) by 878 days.

(21) Appl. No.: 11/882,379

(22) Filed: Aug. 1, 2007

(65) Prior Publication Data

US 2009/0136412 A1    May 28, 2009

(30) Foreign Application Priority Data

Aug. 2, 2006   (JP) .................................. 2006-210655

(51) Int. Cl.
*D01F 9/12* (2006.01)

(52) U.S. Cl. .................. 423/447.1; 423/447.3; 977/742; 977/842; 977/843

(58) Field of Classification Search ............... 423/447.1, 423/447.2, 445 B; 977/742, 842
See application file for complete search history.

(56) References Cited

U.S. PATENT DOCUMENTS

| 6,837,928 B1 * | 1/2005 | Zhang et al. ............... 117/95 |
| 6,863,942 B2 * | 3/2005 | Ren et al. .................. 428/36.9 |
| 2004/0109815 A1 * | 6/2004 | Liu et al. ................... 423/447.1 |

FOREIGN PATENT DOCUMENTS

| JP | 2003-95626 | 4/2003 |
| JP | 2003-292313 | 10/2003 |
| JP | 2004-210608 | 7/2004 |

OTHER PUBLICATIONS

Diamond and Related Materials, vol. 13, Issues 4-8, Apr.-Aug. 2004, pp. 1232-1236 W. Y. Lee, T. X. Liao, Z. Y. Juang, C. H. Tsai.*
Recih, S.; Lan, J.; R, J. "Control the chirality of carbon nanotubes by epitaxial growth". Chem. Phys. Letters. 421 (2006), 469-472. Aailable online Mar. 6, 2006.*
Hofmann et al. "In situ Observations of Catalyst Dynamics during Surface-Bound Carbon Nanotube Nucleation". Nano Letters. 2007 7 (3) 602-608.*
Y. Kobayashi, H. Nakashima, D. Takagi, Y. Homma, CVD growth of single-walled carbon nanotubes using size-controlled nanoparticle catalyst, Thin Solid Films, vols. 464-465, Oct. 2004, pp. 286-289, ISSN 0040-6090, 10.1016/j.tsf.2004.06.045. (http://www.sciencedirect.com/science/article/pii/S0040609004007850).*
D. Aurongzeb, et al.; "Self-assembly of faceted Ni nanodots on Si(111);" *Applied Physics Letters*; vol. 86, 2005; pp. 103107-1-103107-3 (3 Sheets).

* cited by examiner

*Primary Examiner* — Stuart Hendrickson
*Assistant Examiner* — Richard M Rump
(74) *Attorney, Agent, or Firm* — Kratz, Quintos & Hanson, LLP

(57) ABSTRACT

Carbon atoms are fed to a catalytic metal particle 10 having a atomic arrangement of triangular lattices in a round (or partly round) of a side wall, and a graphen sheet 18 having a six-membered structure reflecting the atomic arrangement of the triangular lattices is consecutively formed by the metal catalyst, whereby a tubular structure of the carbon atoms is formed. Thus, the chirality of the tubular structure can be controlled by the growth direction of the graphen sheet with respect to the direction of the triangular lattices, and the diameter of the tubular structure can be controlled by the size of the catalytic metal particle.

17 Claims, 12 Drawing Sheets

METHOD OF MANUFACTURING CARBON NANOTUBE

CROSS-REFERENCE TO RELATED APPLICATIONS

This application is based upon and claims the benefit of priority from the prior Japanese Patent Application No. 2006-210655, filed on Aug. 2, 2006, the entire contents of which are incorporated herein by reference.

BACKGROUND OF THE INVENTION

The present invention relates to a method of manufacturing a carbon nanotube, more specifically, a method of manufacturing a carbon nanotube which can control the chirality.

Carbon nanotube is a material of a graphen sheet of six-membered rings of carbon atoms formed in a tube of a diameter of below several nanometers. The carbon nanotube has good properties, as of high electric conductivity, thermal conductivity, electron emission characteristics, slidability, strength, chemical stability, etc., and their applicability in various fields is being investigated.

It is known that the carbon nanotube has the electric characteristics varied, depending on windings of the graphen sheet, i.e., diameter and chirality of the carbon nanotube to thereby exhibit metal properties or semiconductor properties. Accordingly, to obtain electric characteristics corresponding to applications, it is important to control the diameter and chirality of the carbon nanotube.

The related arts are disclosed in, e.g., Reference 1 (Japanese published unexamined patent application No. 2003-095626), Reference 2 (Japanese published unexamined patent application No. 2003-292313) and Reference 3 (Japanese published unexamined patent application No. 2004-210608).

However, no successful example of controlling the chirality of the carbon nanotube has been found. Yet, successful examples of judging whether the carbon nanotube is metallic or semiconductive are found. In these examples, d.c. voltage is applied to a carbon nanotube which has not been judged metallic or semiconductive. When the carbon nanotube is metallic, large current flows, and the tube is broken. On the other hand, when the carbon is semiconductive, less current flows, and the tube remains unbroken. However, this method cannot select the metallic carbon nanotube alone and cannot control the chirality.

As described above, the method for controlling the chirality, which is very important in terms of the application, has not been yet established, and the metallic carbon nanotube and the semiconductive carbon nanotube so far have not been able to be selectively formed.

Accordingly, for example, in forming a device with semiconductive carbon nanotubes, metallic nanotubes inevitably get into the device structure. For example, in a transistor having the channel of a carbon nanotube, the carbon nanotube which is metallic short-circuits the source and drain, and the amplification and switching operation are not good. In optical devices, the yields of light emission and light detection have been degraded.

SUMMARY OF THE INVENTION

An object of the present invention is to provide a method of manufacturing a carbon nanotube which can control the chirality and can selectively form metallic carbon nanotubes and semiconductive carbon nanotubes.

According to one aspect of the present invention, there is provided a method of manufacturing a carbon nanotube comprising: feeding carbon atoms to a metal catalyst having an atomic arrangement of triangular lattices in a round of a side wall, to thereby consecutively form a graphen sheet having a six-membered ring structure reflecting the atomic arrangement of the triangular lattices, whereby a tubular structure of the carbon atoms is formed.

According to the present invention, a metal catalyst having a triangular lattice structure in side walls is used, and a growth direction of a graphen sheet with respect to a direction of the triangular lattices of the metal catalyst is suitably controlled, whereby the chirality of the growing carbon nanotube can be easily controlled. The diameter of the carbon nanotube can be controlled by the size of the metal catalyst, whereby the metallic carbon nanotube and the semiconductive carbon nanotube can be easily selectively formed. Thus, the characteristics and yields of the devices using carbon nanotubes can be improved.

DETAILED DESCRIPTION OF THE PREFERRED EMBODIMENTS

[A First Embodiment]

The method of manufacturing the carbon nanotube according to a first embodiment of the present invention will be explained with reference to FIGS. 1 to 9B.

Figure 3:
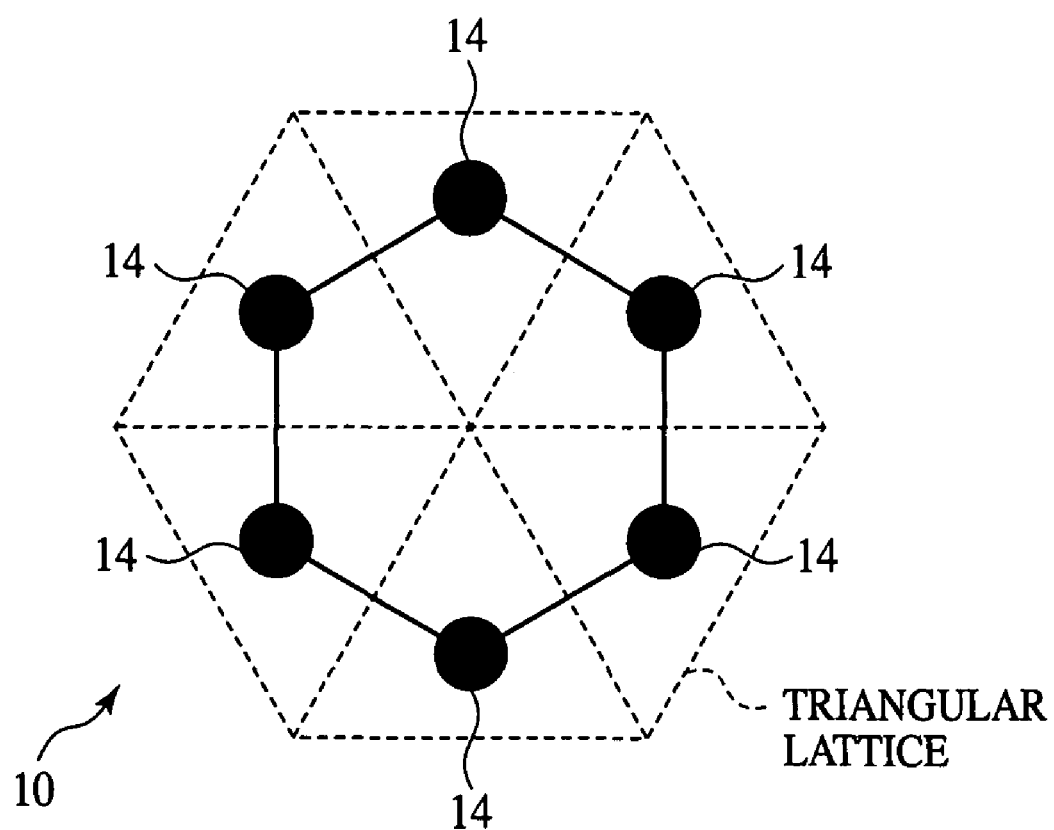
FIG. 3 is a view showing the six-membered structure of carbon atoms formed by the catalytic metal particle.
Figure 4A:
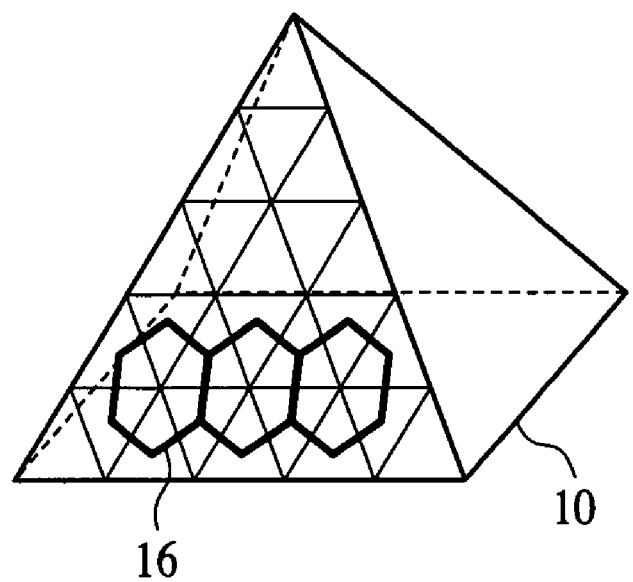
FIGS. 4A and 4B are views showing the relationship between the direction of the triangular lattices of the catalytic metal particle and the direction of the six-memberd rings of the carbon atoms.
Figure 4B:
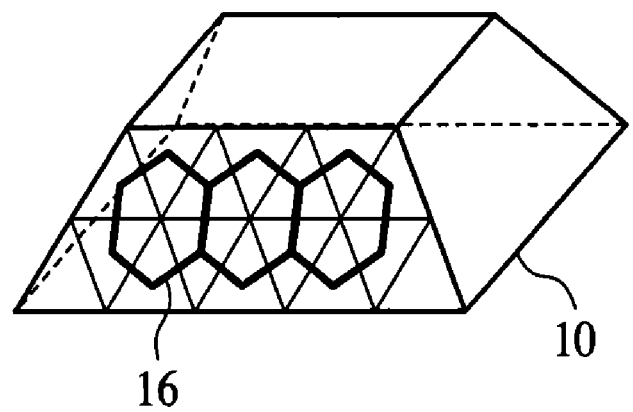
Figure 7A:
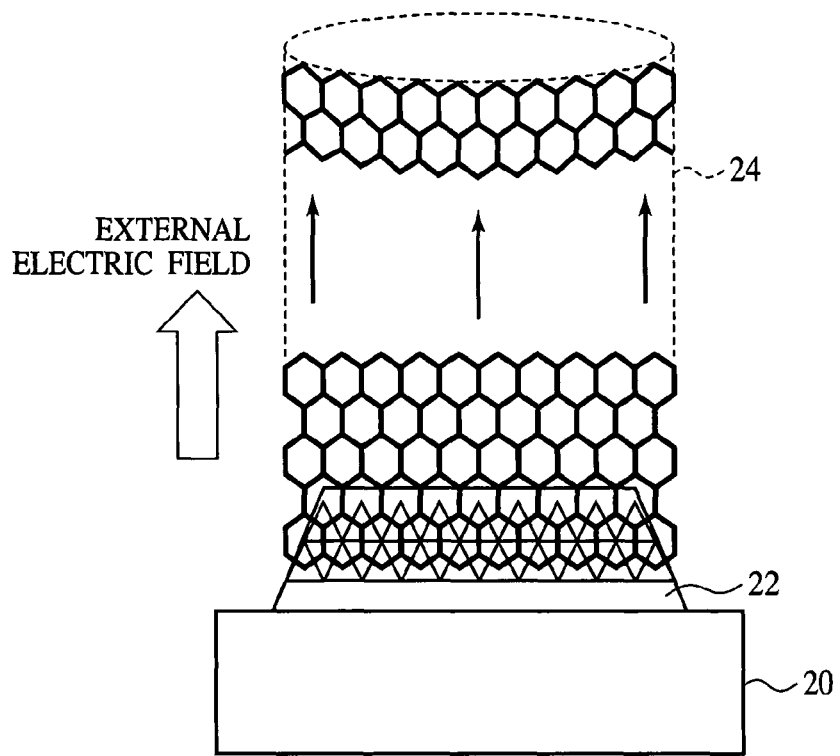
FIGS. 7A, 7B and 8 are views showing the methods for controlling the chirality of the carbon nanotube used in the first embodiment of the present invention.
Figure 7B:
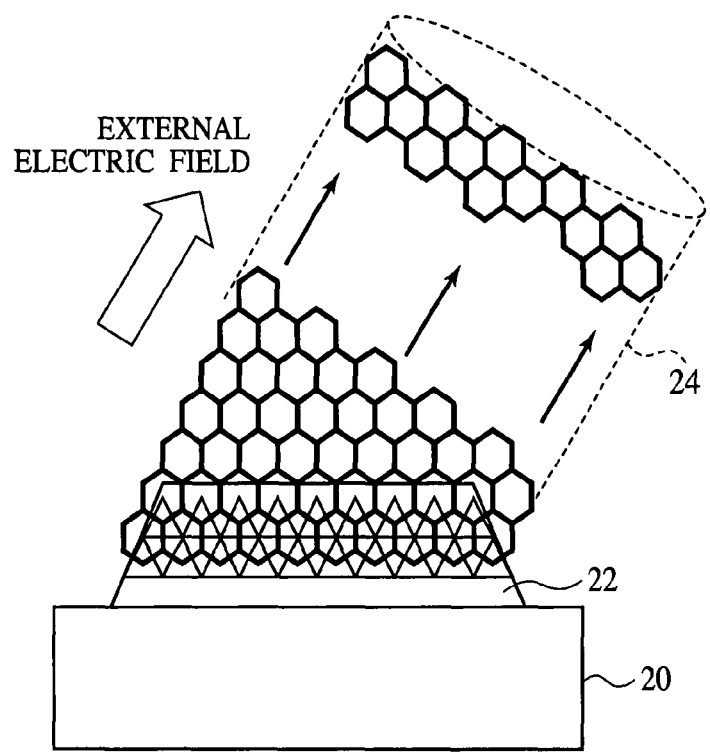
Figure 8:
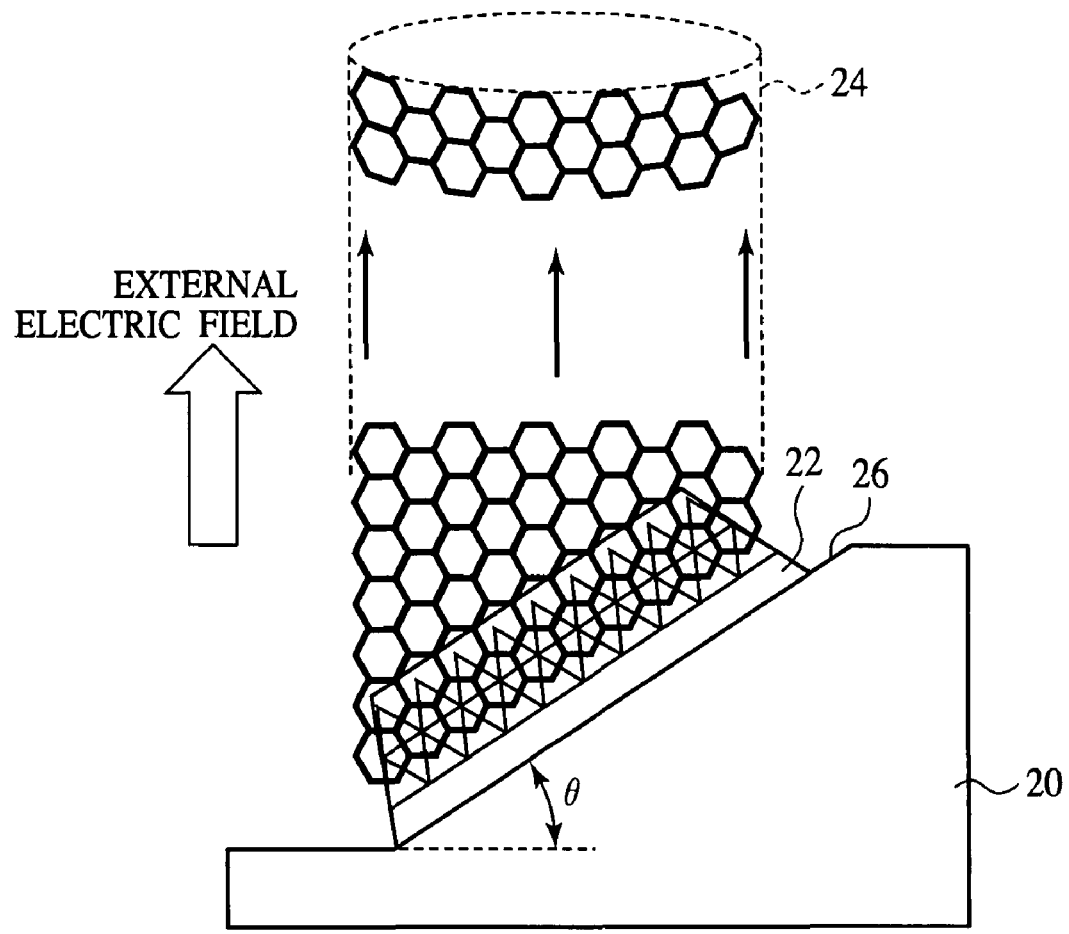
Figure 9A:
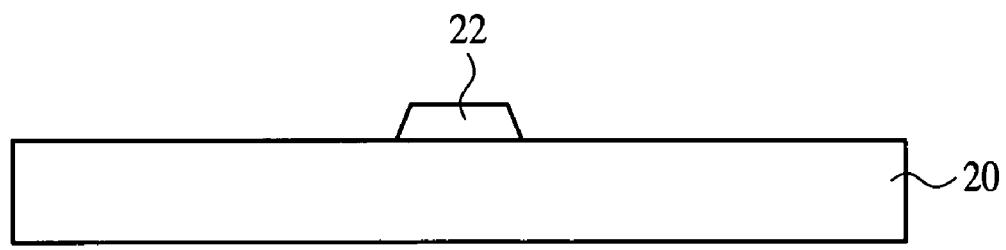
FIGS. 9A-9B are views showing the steps of the method of manufacturing the carbon nanotube according to the first embodiment of the present invention.
Figure 9B:
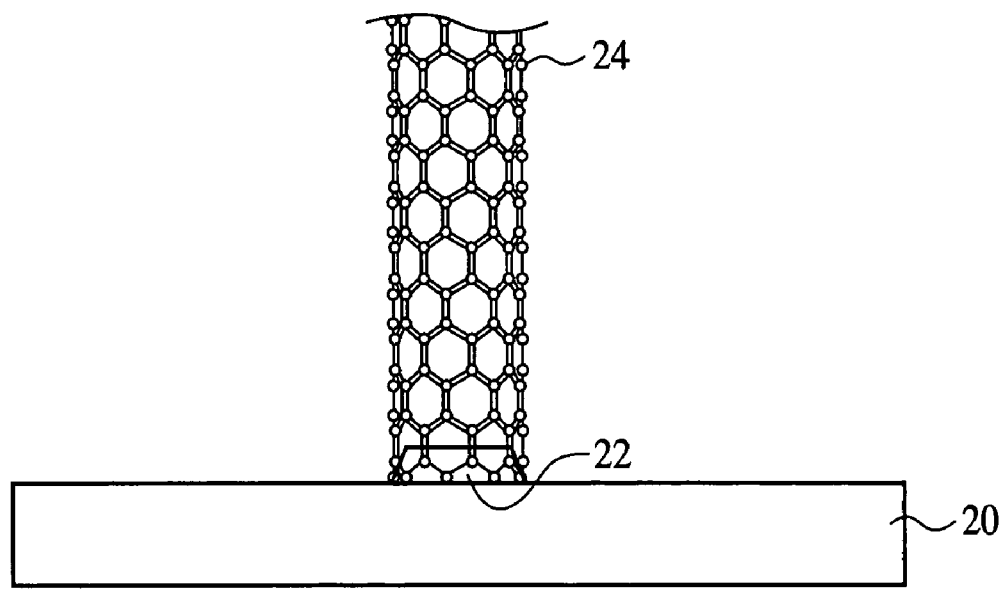

FIGS. 1 and 2A-2C are diagrammatic views showing structures of the catalytic metal particle used in the method of manufacturing the carbon nanotube according to the present embodiment. FIG. 3 is a view showing the six-membered structure of carbon atoms formed by the catalytic metal particle. FIGS. 4A and 4B are views showing the relationship between the direction of the triangular lattices of the catalytic metal particle and the direction of the six-memberd rings of the carbon atoms. FIGS. 5A-5C and 6A-6C are views showing the processes of the growth of the carbon nanotube by the use of the catalytic metal particle. FIGS. 7A, 7B and 8 are views showing the methods for controlling the chirality of the carbon nanotube. FIGS. 9A-9B are views showing the steps of the method of manufacturing the carbon nanotube according to the present embodiment.

First, the catalytic metal used in the method of manufacturing the carbon nanotube according to the present embodiment will be explained with reference to FIGS. 1 to 6C. The catalytic metal is a metallic material which functions as a kind of catalyst in producing graphite and is a transition metal material, such as Ni (nickel), Co (cobalt), Fe (iron) or others, or an alloy material containing any one of them.

Figure 1:
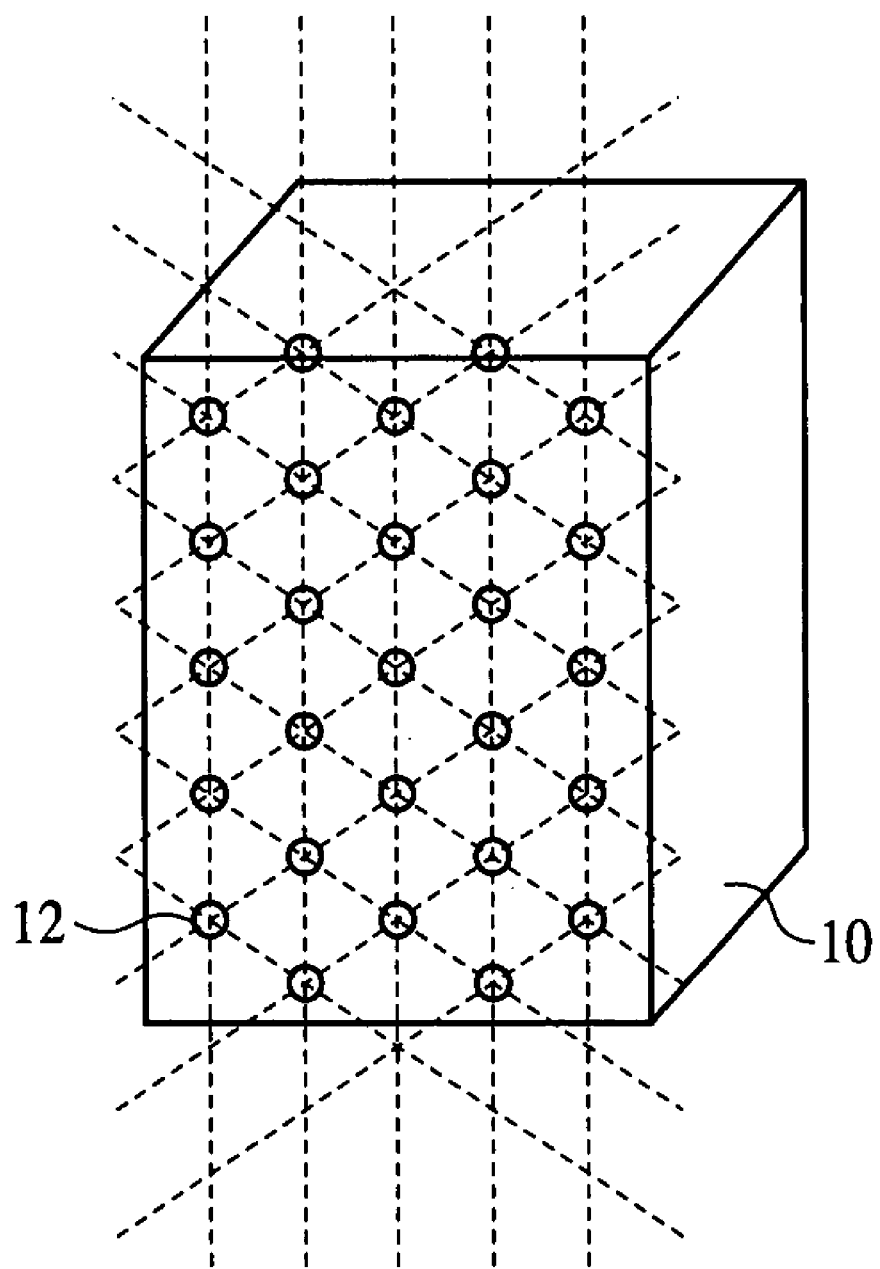
FIGS. 1 and 2A-2C are diagrammatic views showing structures of the catalytic metal particle used in the method of manufacturing the carbon nanotube according to a first embodiment of the present invention.

In the method of manufacturing the carbon nanotube according to the present embodiment, a particulate catalytic metal (hereinafter called a catalytic metal particle) having the triangular lattice structure in the side walls is used. As shown in FIG. 1, the catalytic metal particle 10 having the triangular lattice structure has the atomic structure that the surface atoms 12 are arranged in triangular lattices (indicated by the broken lines in the drawing). The triangular lattices are formed, surrounding (or partly surrounding) the catalytic metal particle 10. As the catalytic metal having the triangular lattice structure, Ni having the closest packed structure is exemplified.

Figure 2A:
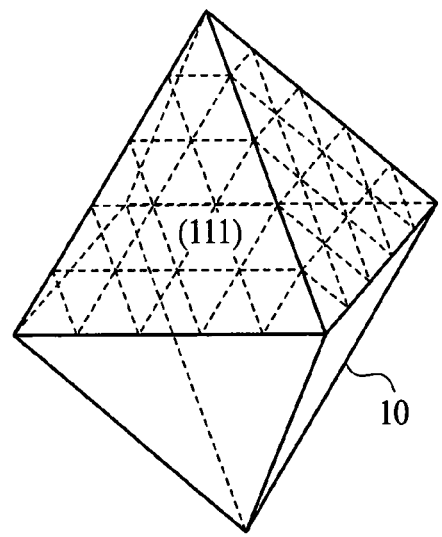
Figure 2B:
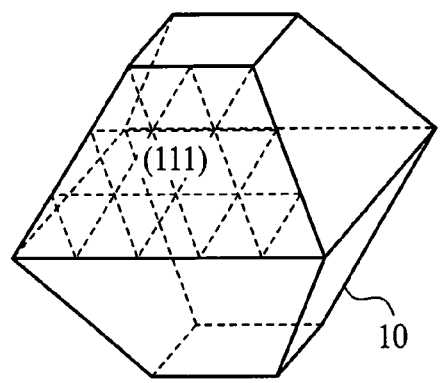
Figure 2C:
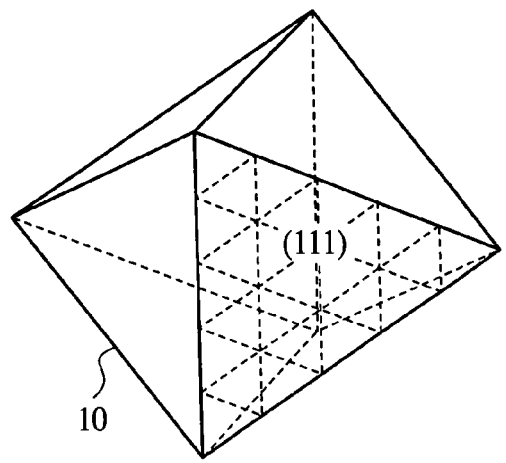

FIGS. 2A-2C show examples of the catalytic metal particle 10, including a specific plane orientation. FIG. 2A shows a pyramidal structure, FIG. 2B shows a trapezoidal structure (rectangular frustum) having the top of the pyramidal structure cut off, and FIG. 2C is the structure of FIG. 2A turned by 90 degrees. The inclined side walls in FIGS. 2A and 2B are the (111) planes.

In a growth of a carbon nanotube, carbon atoms fed as the raw material enter the catalytic metal particle. The carbon atoms 14 which have entered the catalytic metal particle form the six-membered structure as shown in FIG. 3 due to the triangular lattices formed by the constituent atoms of the catalytic metal particle 10. That is, the carbon atoms bond to each other not like SP3 but like SP2, in other words, form a graphen sheet structure of not three dimensions but two dimensions.

FIGS. 4A and 4B show the direction of the triangular lattices of the structures of the catalytic metal particle 10, which are respectively similar to the structures of FIGS. 2A and 2B, and the direction of the six-members rings 16 of the carbon atoms deposited by the catalytic metal particle 10. The metal catalyst particle 10 of the rectangular frustum structure shown in FIG. 4B can be formed, e.g., by forming a Ni catalytic thin film on a Si (111) substrate and making thermal processing on the Ni catalytic thin film for several minutes at 500° C (refer to, e.g., "Self-assembly of faceted Ni nanodots on Si (111)", D. Aurongzeb et al., Applied Physics Letters 86, 103107, 2005). The rectangular frustum has side walls of Ni (111) and an upper surface of Ni (110).

The catalytic metal particle 10 may be formed by forming a rectangular frustum base structure of another material and depositing the catalytic metal material on the surface. Otherwise, the catalytic metal particle having a prescribed size and the plane orientation controlled in advance may be prepared and arranged on a substrate. In this case, even when the catalytic metal particle has various plane orientations with respect to the substrate and the orientations are not uniformly formed, heating processing is made in growing the carbon nanotube or as pre-processing to thereby make the plane orientations uniformly one plane orientation reflecting the plane orientation of the base structure.

Figure 5A:
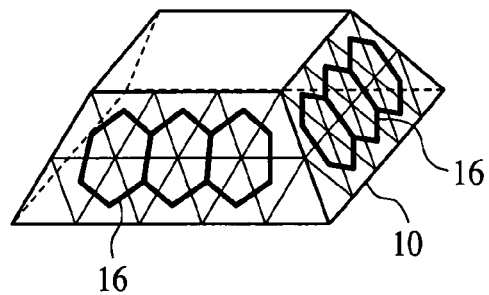
FIGS. 5A-5C and 6A-6C are views showing the processes of the growth of the carbon nanotube by the use of the catalytic metal particle.
Figure 5B:
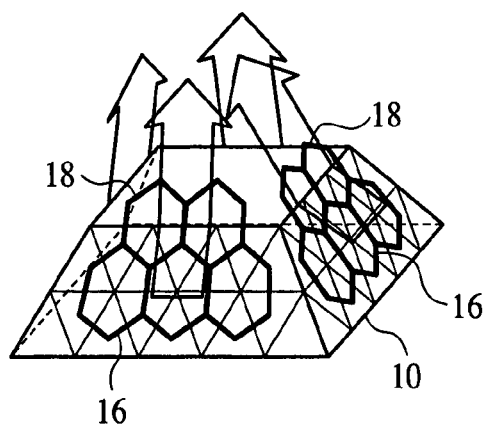
Figure 5C:
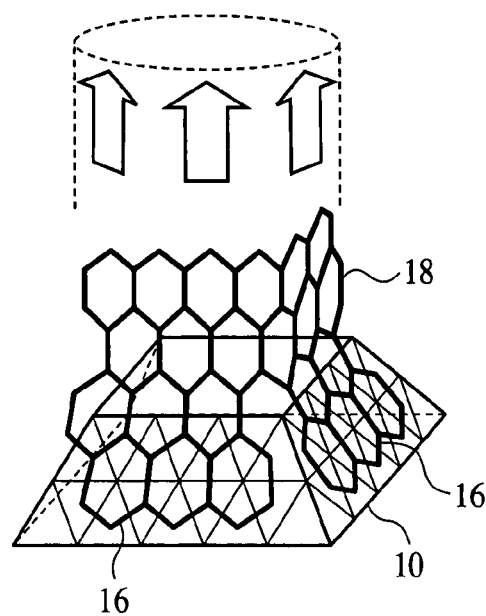

When carbon atoms are further fed to the catalytic metal particle 10, graphen sheets 18 are deposited from the triangular lattices of the respective side walls of the catalytic metal particle 10, these graphen sheets 18 form a tubular structure, and the tubular structure grows into a carbon nanotube (see FIGS. 5A to 5C). The diameter of the carbon nanotube can be controlled by the size of the catalytic metal particle 10. When the catalytic metal particle 10 shown in FIGS. 4A and 4B is used, a carbon nanotube having the chirality so called zigzag type is formed.

Figure 6A:
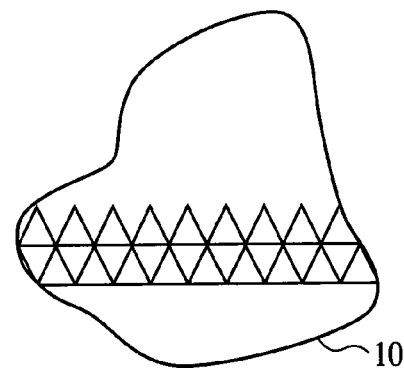
Figure 6B:
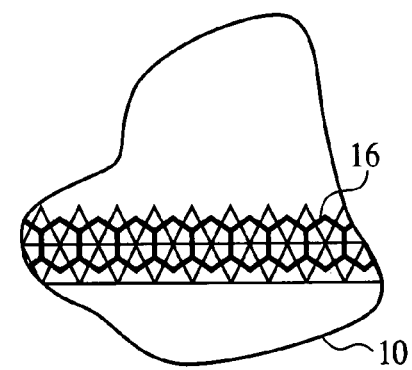
Figure 6C:
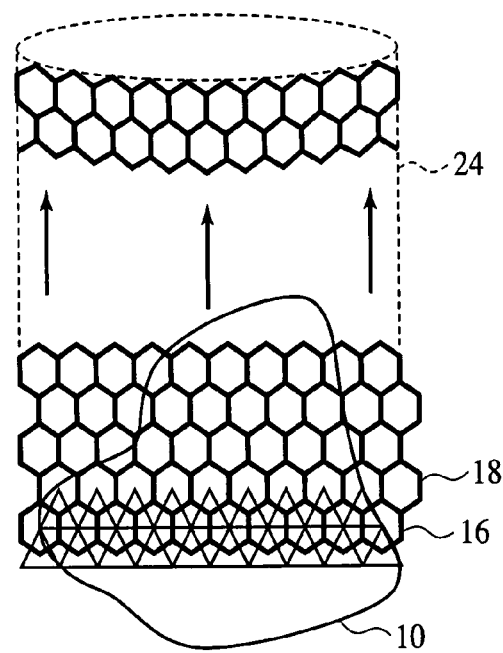

The catalytic metal particle 10 does not essentially have the structure shown in FIGS. 4A and 4B and may have the structure that at least two continuous levels of triangular lattices surround the catalytic metal particle 10 as shown in FIGS. 6A to 6C. FIGS. 6A to 6C show the process of the growth of the carbon nanotube in this case.

Next, the method for controlling the chirality of the carbon nanotube by using such catalytic metal particle will be explained.

As described above, the direction of the six-membered rings of the graphen sheet reflects the direction of the triangular lattices of the catalytic metal particle. Accordingly, the growth direction of the carbon nanotube with respect to the direction of the triangular lattices of the catalytic metal particle is controlled, whereby the chirality of the carbon nanotube can be controlled.

The growth direction of the carbon nanotube can be controlled by applying an external electric field in the growth.

For example, as shown in FIG. 7A, the catalytic metal particle 22 shown in FIG. 4B is formed on a substrate 20, then an external electric filed is applied in the normal direction of the substrate 20, and the carbon nanotube 24 grows in the application direction of the external electric field. In the graphen sheets growing, the apexes of the six-membered rings face upward, and the carbon nanotube 24 of the so-called zigzag type is formed.

For example, as shown in FIG. 7B, even when an external electric field is applied at 30 degrees to the normal direction of the substrate 20, the carbon nanotube 24 grows in the application direction of the external electric field. In this case, in the graphen sheets growing, the sides of the six-membered rings face upward, and the carbon nanotube of the so-called armchair type is formed.

Otherwise, in place of changing the application direction of the external electric field with respect to the normal direction of the substrate 20, the direction of the triangular lattices of the catalytic metal particle 22 is changed, whereby the chirality of the carbon nanotube 24 can be controlled. For example, as shown in FIG. 8, an inclined surface 26 of a certain angle (e.g., angle $\theta=30$ degrees) by, e.g., etching the substrate 20, and on the inclined surface 26, the catalytic metal particle 22 is formed. Thus, with the application direction of the external electric field set in the normal direction of the substrate 20, the chirality of the carbon nanotube can be controlled.

In the carbon nanotube of the zigzag type, the metallic characteristics and the semiconductive characteristics alternately take place, depending on the diameters thereof. Accordingly, in order to perfectly control the characteristics of the zigzag carbon nanotube, it is necessary that in addition to the above, the size of the catalytic metal particle 22 is controlled to thereby control the diameter of the carbon nanotube 24 as well.

By utilizing the above-described mechanism, the direction of the triangular lattices of the catalytic metal particle with respect to the growth direction of the carbon nanotube, and the size of the catalytic metal particle are controlled, whereby the chirality and the characteristics of the carbon nanotube can be freely controlled.

The growth of the carbon nanotube includes the mode that the catalytic metal particle grows the carbon nanotube upward, remaining on the substrate surface (called the root growth), and the mode that the catalytic metal particle always leads forward, forming the carbon nanotube at the rear (called the forward growth). In both growth modes, the catalytic metal particle having the triangular lattices in the side walls is used to thereby grow the carbon nanotube of the tubularly closed graphen sheet.

Next, the method of manufacturing the carbon nanotube according to the present embodiment will be explained with reference to FIGS. 9A and 9B.

First, the catalytic metal particle 22 is formed on the substrate 20 (FIG. 9A). The catalytic metal particle 22 can be formed by depositing a catalytic metal of, e.g., an about 1 nm-thickness by, e.g., sputtering method or evaporation method and aggregating the catalytic metal by thermal processing. The density of the catalytic metal particle 22 formed on the substrate 20 can be controlled by annealing conditions (temperature and processing period of time).

For example, a Ni catalytic thin film is formed on a (111) Si substrate, then thermal processing is made for several minutes at 500° C. to thereby self-organize the Ni catalytic thin film, and the catalytic metal particle having the sidewalls of Ni (111) and the upper surface of Ni (110) can be formed.

Then, the carbon nanotube 24 is formed on the substrate 20 with the catalytic metal particle 22 formed on. The carbon nanotube is grown by thermal CVD method using, e.g., the mixed gas of acetylene and hydrogen as the reaction gas under the conditions of an 80 sccm flow rate of acetylene, a 20 sccm flow rate of hydrogen, a 200 Pa film forming chamber pressure, a 900° C. substrate temperature.

Otherwise, the carbon nanotube 24 can be formed also by using hot-filament CVD method, in which the reaction gas is dissociated by the hot-filament, under the conditions, e.g., of the mixed gas of acetylene and hydrogen as the reaction gas, an 80 sccm flow rate of acetylene, a 20 sccm flow rate of hydrogen, a 1000 Pa film forming chamber pressure, a 600° C. substrate temperature and a 1800° C. hot-filament temperature.

Otherwise, the carbon nanotube 24 can be formed also by using a DC plasma hot-filament CVD combining DC plasma and a hot-filament under the conditions, e.g., of the mixed gas of acetylene and hydrogen as the reaction gas, an 80 sccm flow rate of acetylene, a 20 sccm flow rate of hydrogen, a 1000 Pa film forming chamber pressure, a 600° C. substrate temperature and a 1800° C. hot-filament temperature.

At this time, to orient the carbon nanotube toward a prescribed direction (e.g., vertical orientation), with the film forming chamber as the ground voltage, DC voltage of, e.g., −400 V is applied to the substrate 20 (see FIG. 7A), and the carbon nanotube oriented toward the electric field can be formed.

Thus, the zigzag carbon nanotube 24 can be grown on the substrate 20 (FIG. 9B). The size of the catalytic metal particle 22 is controlled, whereby the metallic carbon nanotube 24 and the semiconductive carbon nanotube 24 can be selectively formed.

As described above, according to the present embodiment, the catalytic metal particle having the triangular lattice structure in the side walls is used, and the growth direction of the carbon nanotube with respect to the direction of the triangular lattices of the catalytic metal particle is suitably controlled, whereby the chirality of the growing carbon nanotube can be suitably controlled. The diameter of the carbon nanotube can be controlled by the size of the catalytic metal particle, which facilitates the selective formation of the metallic carbon nanotube and the semiconductive carbon nanotube. Thus, the characteristics and yields of devices using the carbon nanotube can be improved.

[A Second Embodiment]

The method of manufacturing the carbon nanotube according to a second embodiment of the present invention will be explained with reference to FIGS. 10A to 12D. The same members of the present embodiment as those of the method of manufacturing the carbon nanotube according to the first embodiment are represented by the same reference numbers not to repeat or to simplify their explanation.

Figure 10A:
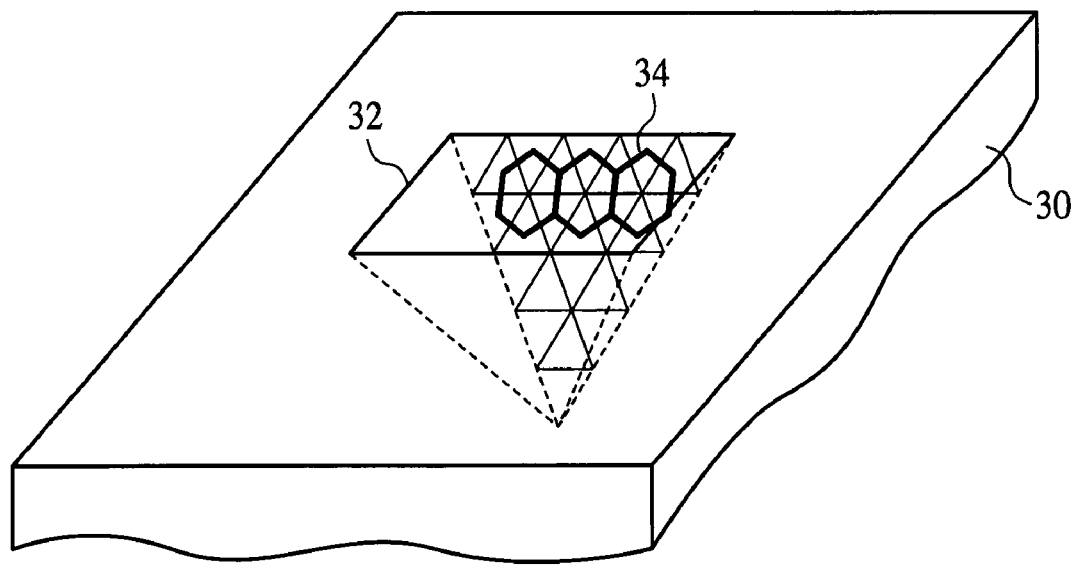
FIGS. 10A-10B are diagrammatic views showing the structures of the catalytic metal film used in the method of manufacturing the carbon nanotube according to a second embodiment of the present invention.
Figure 10B:
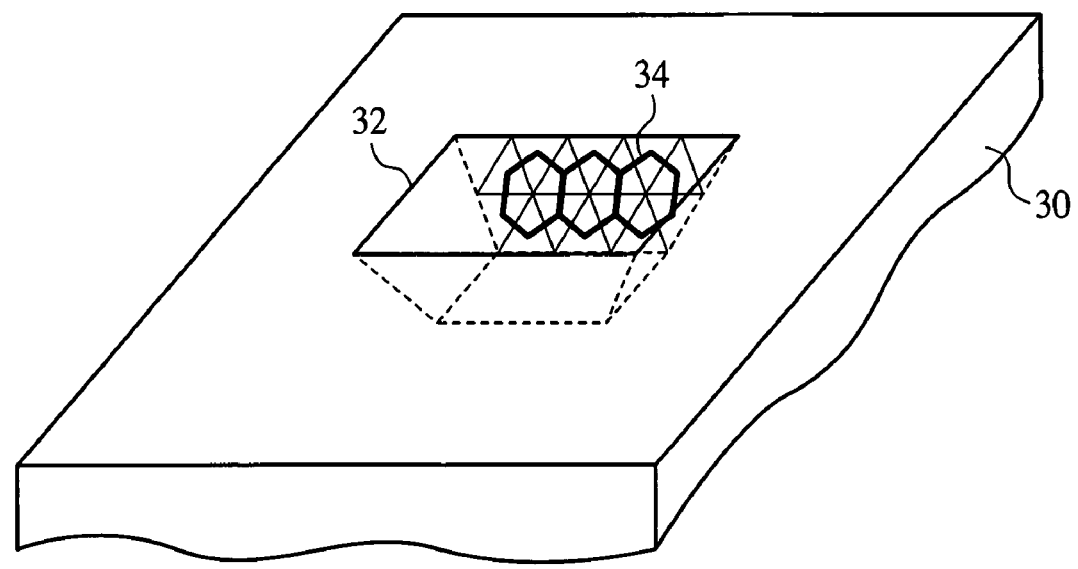
Figure 11A:
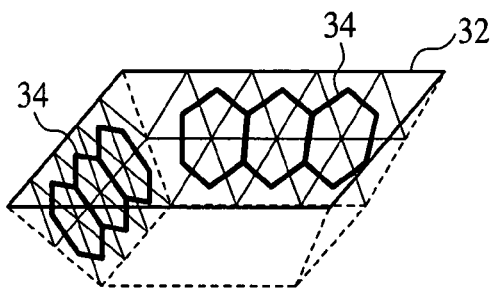
FIGS. 11A-11C are views showing the process of the growth of the carbon nanotube by the use of the catalytic metal film having a pore.
Figure 11B:
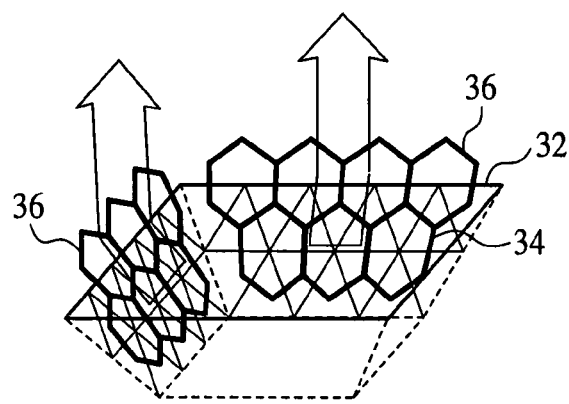
Figure 11C:
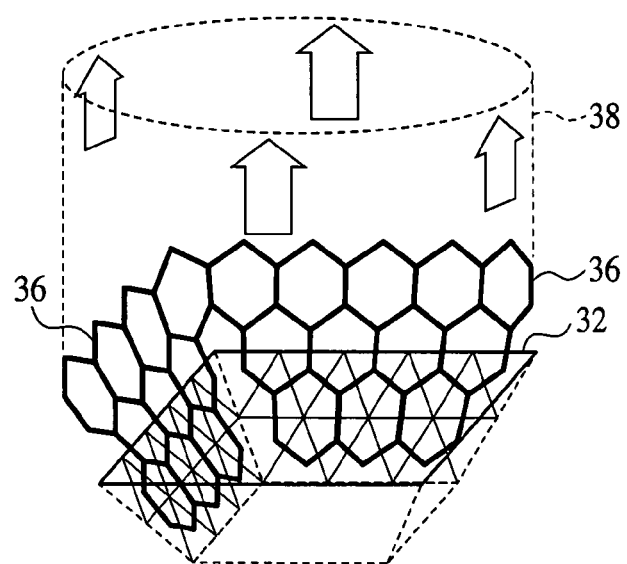

FIGS. 10A-10B are diagrammatic views showing the structures of the catalytic metal film used in the method of manufacturing the carbon nanotube according to the present embodiment. FIGS. 11A-11C are views showing the process of the growth of the carbon nanotube by the use of the catalytic metal film of the present embodiment. FIGS. 12A-12D are views showing the steps of the method of manufacturing the carbon nanotube according to the present embodiment.

First, the catalytic metal used in the method of manufacturing the carbon nanotube according to the present embodiment will be explained with reference to FIGS. 10A and 10B.

In the method of manufacturing the carbon nanotube according to the present embodiment, a catalytic metal film having a nano-sized pore with triangular lattices formed in the side walls is used as the catalytic metal.

The catalytic metal film having the nano-sized pore formed in the surface is as exemplified in FIGS. 10A and 10B. That is, the catalytic metal film 30 is made of a catalytic metal material having the triangular lattices formed in the side walls of the pore. The catalytic metal film 32 is, e.g., Ni film. The surface of the catalytic metal film 32 is Ni (100), and the side walls of the pore are Ni (111).

In the growth of the carbon nanotube using the catalytic metal film 30 having the pore 32 as well as using the catalytic metal particle, carbon atoms fed as the raw material enter the catalytic metal film 30 at the side walls of the pore 32 and form six-membered rings 34 due to the triangular lattices in the side walls of the pore 32. With the feed of carbon atoms to the catalytic metal film 30 set on, graphen sheets 36 are formed from the triangular lattices of the respective side walls of the pore 32, and the graphen sheets 36 form a tubular structure to grow into the carbon nanotube 38 (see FIGS. 11A to 11C). The diameter of the carbon nanotube can be controlled by the size of the pore 32. When the catalytic metal film 30 shown in FIGS. 10A and 10B is used, the carbon nanotube has the so-called zigzag chirality.

The chirality of the carbon nanotube 38 can be controlled in the same way as in the method of manufacturing the carbon nanotube according to the first embodiment. That is, the direction of the triangular lattices of the pore with respect to the growth direction of the carbon nanotube is controlled, whereby the chirality of the carbon nanotube can be freely controlled.

Next, the method of manufacturing the carbon nanotube according to the present embodiment will be explained with reference to FIGS. 12A-12D.

First, the catalytic metal film 42 is formed on the substrate by, e.g., sputtering method or evaporation method. The substrate 40 is, e.g., a (100) Si substrate, and the catalytic metal film 42 is, e.g., Ni film having (100)-oriented upper surface.

Figure 12A:
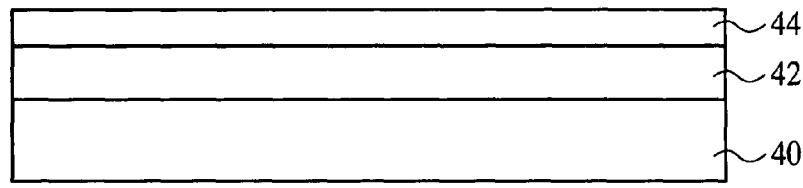
FIGS. 12A-12D are views showing the steps of the method of manufacturing the carbon nanotube according to the second embodiment of the present invention.

Next, on the catalytic metal film 42, a silicon oxide film is deposited by, e.g. CVD method to form a mask film 44 of the silicon oxide film (FIG. 12A).

Then, a photoresist film 46 exposing a region for the carbon nanotube to be formed in is formed on the mask film 44 by photolithography.

Figure 12B:
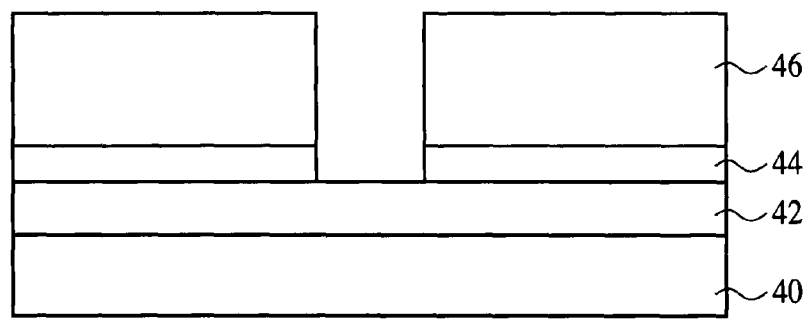

Next, with the photoresist film as the mask, the mask film 44 is anisotropically etched to transfer the pattern of the photoresist film 46 to the mask film 44 (FIG. 12B).

Then, with the mask film 44 as the mask, the catalytic metal film 42 is anisotropically etched to form the nano-sized pore 48 in the surface of the catalytic metal film 42. At this time, by using the anisotropic etching having plane orientation dependency, the plane orientation exposed on the side walls of the pore 48 can be made, e.g., Ni (111).

Figure 12C:
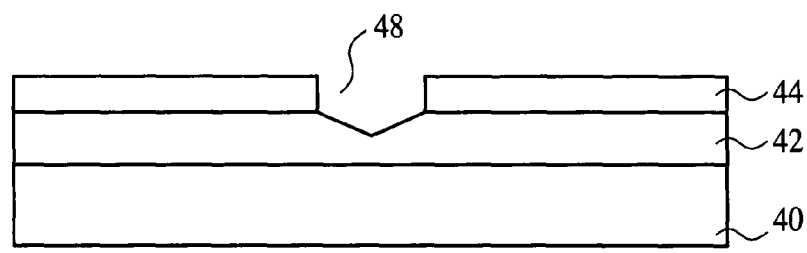

Next, the photoresist film 46 is removed by, e.g., ashing method (FIG. 12C).

Figure 12D:
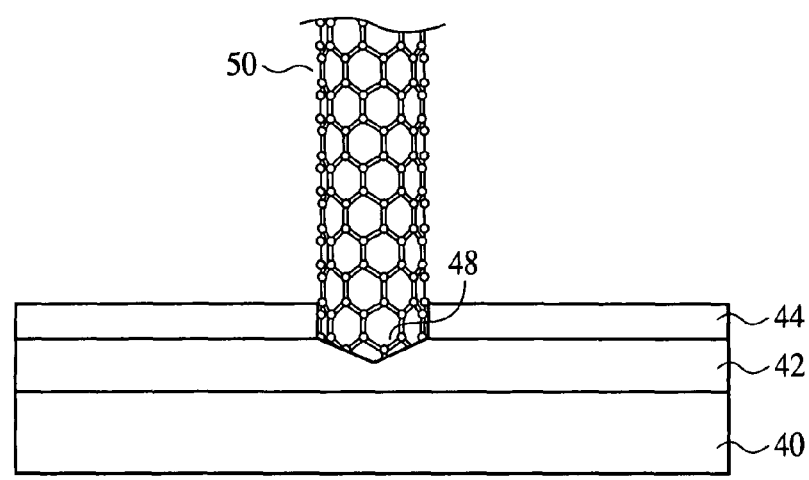

Next, on the catalytic metal film 42, the carbon nanotube 50 is grown in the same way as in, e.g., the first embodiment (FIG. 12D). At this time, to orient the carbon nanotube in a prescribed direction (e.g., vertical orientation), e.g., −400 V DC voltage is applied to the substrate with the film forming chamber as the ground voltage.

Thus, the zigzag-type carbon nanotube 50 can be grown on the substrate 40. The size of the pore 48 is controlled, whereby the metallic carbon nanotube 50 and the semiconductive carbon nanotube 50 can be selectively formed.

As described above, according to the present embodiment, the catalytic metal film having the triangular lattices in the side walls of the nano-sized pore is used, and the growth direction of the carbon nanotube with respect to the triangular lattices is suitably controlled, whereby the chirality of the growing carbon nanotube can be suitably controlled. The diameter of the carbon nanotube can be controlled by the size of the pore, which facilitates the selective formation of the metallic carbon nanotube and the semiconductive carbon nanotube. Thus, the characteristics and yields of devices using the carbon nanotube can be improved.

[Modified Embodiments]

The present invention is not limited to the above-described embodiments and can cover other various modifications.

For example, in the above-described embodiments, the catalytic metal material is Ni, but other catalytic metal materials can be used. As other catalytic metal materials, transition metal materials, e.g., Co, Fe, etc. and alloy materials containing them may be used.

In the above-described embodiments, the plane orientation of the side walls of the metal catalyst is the (111) plane. However, the plane orientation is not limited to the (111) plane as far as the arrangement of the surface atoms is the triangular lattice.

What is claimed is:

1. A method of manufacturing a carbon nanotube comprising:
    forming a catalytic metal film over a substrate;
    aggregating the catalytic metal film by a thermal processing to form a catalytic metal particle shaped as a frustum having an upper surface and a side wall, surface atoms on the side wall of the frustum being arranged in a triangular lattice arrangement; and
    feeding carbon atoms to the catalytic metal particle to thereby consecutively deposit from the side wall of the frustum a graphene sheet having a six-membered ring structure reflecting the triangular lattice arrangement of the surface atoms, whereby a tubular structure of the carbon atoms is grown.

2. The method of manufacturing a carbon nanotube according to claim 1, wherein
    a chirality of the tubular structure is controlled by controlling a growth direction of the graphene sheet with respect to a direction of the triangular lattice arrangement.

3. The method of manufacturing a carbon nanotube according to claim 2, wherein
    the chirality of the graphene sheet is controlled by an application direction of an external electric field.

4. The method of manufacturing a carbon nanotube according to claim 1, wherein
    a diameter of the tubular structure is controlled by a size of the catalytic metal particle.

5. The method of manufacturing a carbon nanotube according to claim 1, wherein
    the catalytic metal particle shaped as the frustum having a direction of the triangular lattice arrangement controlled is formed by self-organizing the deposited catalytic metal film by the thermal processing.

6. The method of manufacturing a carbon nanotube according to claim 1, wherein
    the side wall of the frustum has a(111) plane and the triangular lattice arrangement of the surface atoms is formed only on the side wall of the frustum.

7. The method of manufacturing a carbon nanotube according to claim 6, wherein
    the triangular lattice arrangement of the surface atoms is formed circumferentially all around the side wall of the frustum.

8. The method of manufacturing a carbon nanotube according to claim 1, wherein
    the metal catalyst catalytic metal particle is formed of a material selected from the group consisting of Ni, Co, Fe and an alloy material containing at least one of them.

9. The method of manufacturing a carbon nanotube according to claim 1, wherein
    the triangular lattice arrangement of the surface atoms is formed circumferentially all around the side wall of the frustum.

10. The method of manufacturing a carbon nanotube according to claim 1, wherein
    the catalytic metal film is aggregated to form the catalytic metal particle at a first temperature, and
    the tubular structure of the carbon atoms is grown at a second temperature higher than the first temperature.

11. A method of manufacturing a carbon nanotube comprising:
    forming a catalytic metal film over a substrate;
    forming in a surface of the catalytic metal film a pore shaped as a frustum having a bottom surface and a side wall, surface atoms on the side wall of the frustum being arranged in a triangular lattice arrangement; and
    feeding carbon atoms to the catalytic metal film to thereby consecutively deposit from the side wall of the pore a graphene sheet having a six-membered ring structure reflecting the triangular lattice arrangement of the surface atoms, whereby a tubular structure of the carbon atoms is grown.

12. The method of manufacturing a carbon nanotube according to claim 11, wherein
    a diameter of the tubular structure is controlled by a size of the pore.

13. The method of manufacturing a carbon nanotube according to claim 11, wherein
    the pore shaped as the frustum having a direction of the triangular lattice arrangement controlled is formed by subjecting a catalytic metal film to anisotropic etching having plane direction dependency.

14. The method of manufacturing a carbon nanotube according to claim 11, wherein the triangular lattice arrangement of the surface atoms is formed only on the side wall of the frustum, and
the triangular lattice arrangement of the surface atoms is formed circumferentially all around the side wall of the frustum.

15. The method of manufacturing a carbon nanotube according to claim 11, wherein
a chirality of the tubular structure is controlled by controlling a growth direction of the graphene sheet with respect to a direction of the triangular lattice arrangement.

16. The method of manufacturing a carbon nanotube according to claim 15, wherein
the chirality of the graphene sheet is controlled by an application direction of an external electric field.

17. The method of manufacturing a carbon nanotube according to claim 11, wherein
the side wall of the frustum has a (111) plane and the triangular lattice arrangement of the surface atoms is formed only on the side wall of the frustum.

* * * * *